(12) United States Patent
Clauss

(10) Patent No.: US 6,843,044 B2
(45) Date of Patent: Jan. 18, 2005

(54) DETECTION ARRANGEMENT FOR THE DETECTION OF A CROP JAM IN A HARVESTING MACHINE

(75) Inventor: Steffen Clauss, Rieschweiler-Muehlbach (DE)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/656,790

(22) Filed: Sep. 5, 2003

(65) Prior Publication Data

US 2004/0093841 A1 May 20, 2004

(30) Foreign Application Priority Data

Sep. 6, 2002 (DE) ........................................ 102 41 216

(51) Int. Cl.⁷ ............................................. A01D 75/18
(52) U.S. Cl. ...................................................... 56/10.3
(58) Field of Search ............................ 56/10.3, 10.2 R, 56/10.2 J, DIG. 15; 460/1, 2, 3, 6

(56) References Cited

U.S. PATENT DOCUMENTS

| | | | | |
|---|---|---|---|---|
| 4,275,546 A | * | 6/1981 | Bohman et al. | 460/2 |
| 5,070,682 A | * | 12/1991 | Bohman | 56/10.2 J |
| 5,083,976 A | | 1/1992 | McClure et al. | 460/1 |
| 5,787,694 A | | 8/1998 | Tertilt et al. | 56/14.5 |
| 6,192,664 B1 | * | 2/2001 | Missotten et al. | 56/10.2 R |
| 6,381,932 B1 | * | 5/2002 | Clauss | 56/10.2 J |
| 6,507,790 B1 | | 1/2003 | Radomske | 702/39 |
| 2002/0091476 A1 | | 7/2002 | Bedk | 701/50 |

FOREIGN PATENT DOCUMENTS

| | | |
|---|---|---|
| DE | 199 18 552 | 10/2000 |
| EP | 1256270 A1 | 11/2002 |

OTHER PUBLICATIONS

U.S. Published Appllication No. 0172636, dated Sep. 18, 2003.

* cited by examiner

Primary Examiner—Arpad F Kovacs

(57) ABSTRACT

A self-propelled forage harvester includes an overload clutch inserted into the driveline of a crop conveying element of crop pick-up arrangement of the harvesting machine. The overload clutch generates acoustic and/or mechanical vibrations when a defined torque is exceeded, and a knock sensor is provided for sensing when the overload clutch is operating in an overloaded condition. The knock sensor sends a signal to a control arrangement including a signal processor which recognizes a vibration pattern representative of an overload, and in response to such a pattern, sends a control signal for shutting off the drive to various driven components of the harvester.

5 Claims, 4 Drawing Sheets

DETECTION ARRANGEMENT FOR THE DETECTION OF A CROP JAM IN A HARVESTING MACHINE

FIELD OF THE INVENTION

The invention concerns a detection arrangement for the detection of a crop jam in a harvesting machine.

BACKGROUND OF THE INVENTION

DE 199 18 552 A describes a harvesting machine with a harvested crop take-up arrangement, that is equipped with an adjustable hold-down arrangement for the harvested crop that limits its flow in the upward direction. In case of a harvested crop jam that is detected by a crop jam sensor, the hold-down arrangement is raised automatically in order to simplify the ejection of the jammed harvested crop during the reverse operation. The jam sensor detects the drive torque of one of the supply rolls or of the chopper drum of a forage harvester. In another embodiment, the jam sensor measures the torque on the shaft of the upper roll of the slope conveyor of a combine. The jam sensors described can detect jams within the harvesting machine, but are not arranged to detect jams in the front harvesting attachment.

In the subsequently published European patent application EP 02100450.2, a front harvesting attachment is described with a torque sensor inserted into the driveline of its crop conveying elements. The torque sensor transmits a torque signal that is conducted to a control arrangement which compares it with an allowable maximum value. If the torque signal exceeds the maximum value, the drive of the front harvesting attachment is automatically turned off. Here, as in the case of the harvesting machine according to DE 199 18 552 A, an additional sensor is provided that must be connected electrically with the harvesting machine. Therefore, a certain expense is required in order to be able to recognize a crop jam.

From U.S. Pat. No. 5,070,682 A, an acoustic detector has become known for sensing of an airborne noise that is expected to detect stones intruding into the crop supply mechanism of a forage harvester. This detector is not appropriate for the detection of a crop jam.

SUMMARY OF THE INVENTION

The problem underlying the invention is seen in the need to make available an improved arrangement for the detection of a crop jam in a front harvesting attachment or a harvesting machine that is distinguished by low cost and high reliability.

An object of the invention is to provide a crop harvesting machine including an acoustical sensor for detecting when a crop feeding condition has occurred, which indicates that there is a crop jam.

It is proposed that an overload clutch be inserted into the driveline of a crop conveying element of the harvesting machine that interrupts the driveline, in the case that an established torque limit is exceeded due to a crop jam, and that generates acoustic or mechanical vibrations. The detection arrangement is equipped with a sensor that can, if necessary, receive these vibrations and detects them with the use of an appropriate analog and/or digital signal processor. A control arrangement connected with the sensor can inform the operator of the harvesting machine acoustically and/or optically in case of a crop jam, or even take appropriate steps automatically to remove the crop jam, particularly turning off the drive of the crop conveying element, raising the hold-down arrangement of a pick-up or a reel of a cutter head, and/or reversing the drive of the crop conveying element.

In this way, the result is a relatively simple and low cost detection arrangement for a crop jam. Only a single sensor is required that can interact with as many overload clutches as desired.

The sensor is preferably an acoustic sensor (microphone) to which the vibrations generated by the overload clutch are transmitted by airborne sound (acoustically) and/or structure-borne sound (mechanically). Preferably, a commercially available knock sensor can be used as it is applied to engines for the detection of undesirable knock noises. Such a knock sensor can also be used to control other elements of the harvesting machine, in which a forage harvester, for example, uses such a device for the positioning of the spacing between a chopper drum and a shear bar. The vibrations generated by the overload clutch are transmitted to knock sensors of this type, primarily mechanically, that is by structure-borne sound.

An advantage of the detection arrangement according to the invention lies in the fact that it is also appropriate for the detection of a crop jam in a front harvesting attachment, for example, a pick-up, a corn head, a cutter head or a corn picker of a combine. For this purpose, the overload clutch is inserted into the driveline of the front harvesting attachment. The overload clutch may be located on the harvesting machine or on the front harvesting attachment. As a rule, the sensor is attached to the harvesting machine, which obviates the routing of additional lines or the provision of a wireless connection for the front harvesting attachment, although it would also be possible to fasten the sensor to the front harvesting attachment. The vibrations generated by the overload clutch are transmitted—as a rule mechanically—through the frame of the front harvesting attachment and over the intake housing to the harvesting machine, where they are detected by the sensor.

All configurations of mechanical overload clutches can be considered that generate detectible vibrations when an established torque in the driveline is exceeded. Appropriate clutches are, for example, cam-controlled clutches and star ratchets.

BRIEF DESCRIPTION OF THE DRAWINGS

The drawings show an embodiment of the invention that shall be described in greater detail in the following.

DESCRIPTION OF THE PREFERRED EMBODIMENT

Figure 1:
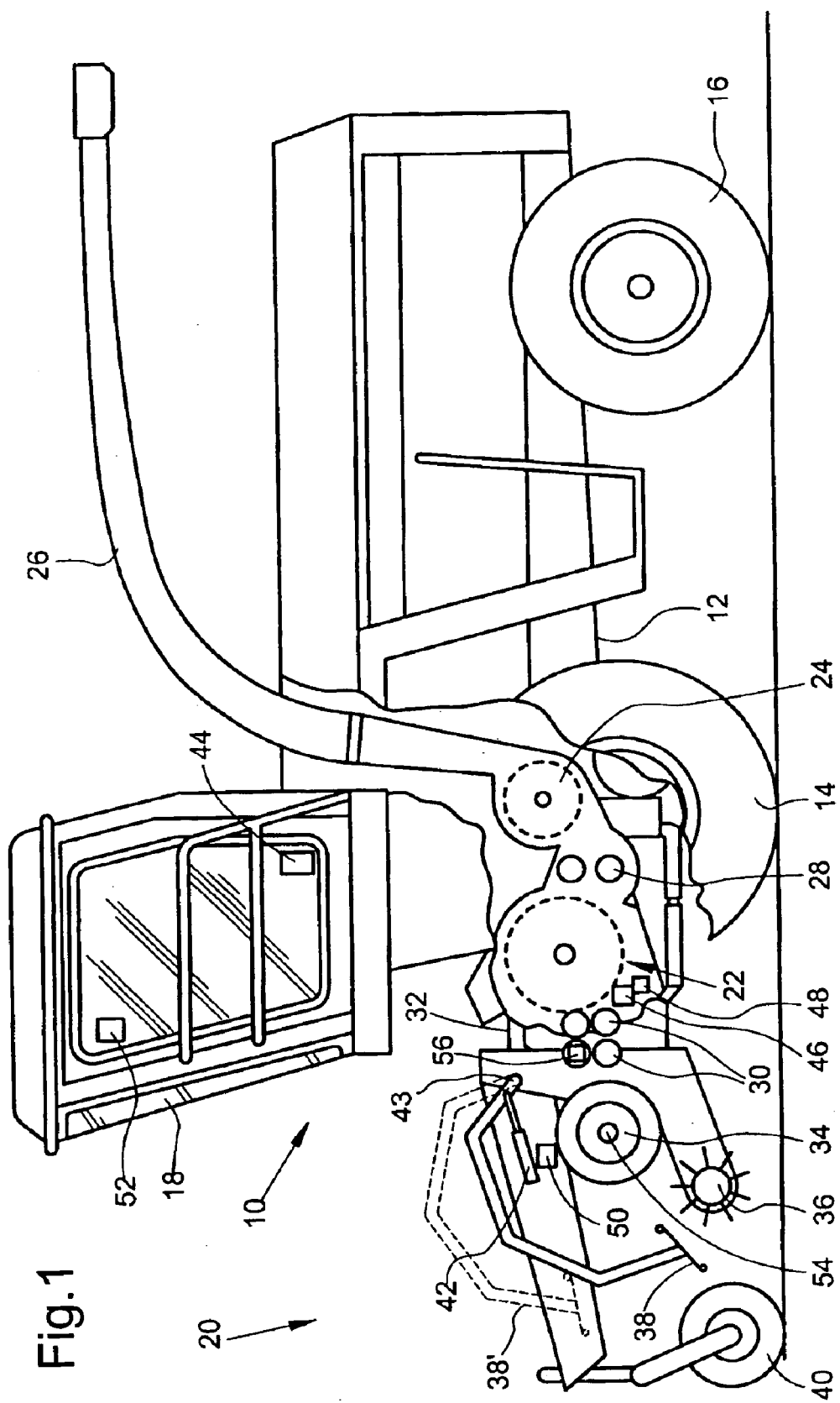
FIG. 1 is a schematic left side view of a harvesting machine with a detection arrangement according to the invention.

Referring to FIG. 1, there is shown a harvesting machine in the form of a self-propelled forage harvester 10, in which a detection arrangement is provided for the detection of a crop jam. The forage harvester 10 is supported on a frame 12 that is carried on front and rear wheels 14 and 16. The forage harvester 10 is controlled from an operator's cab 18 from which a crop take-up arrangement 20 can be viewed and controlled. Crop taken up from the ground by means of the crop take-up arrangement 20, for example, corn, grass or the like is conducted over supply or feed rolls 30 that are arranged within an intake housing 32 to a chopper drum 22 that chops the crop into small pieces in interaction with a shear bar 46 and delivers it to a conveyor or blower arrangement 24. The crop leaves the forage harvester 10 to a transport vehicle operating alongside it or a trailer over a discharge duct 26 which is mounted for being adjusted about an upright axis. A post-chopper reduction arrangement or kernel processor 28 extends between the chopper drum 22 and the conveyor arrangement 24, through which the crop to be conveyed is conducted tangentially to the conveyor arrangement 24.

In this embodiment, the crop take-up arrangement 20 is configured as a so-called pick-up and arranged as an independent unit. However, this crop take-up arrangement 20 could also be an attached implement that is attached, for example, to a flange at the front region of a cutter head of a combine. During operation on the field, the crop take-up arrangement 20 is supported on the ground by support wheels 40. The assignment of the crop take-up arrangement 20 consists of taking up harvested crop of the most varied types and conditions deposited in swaths on the ground and to conduct it to the forage harvester 10 for further processing. For this purpose, the harvested crop take-up arrangement 20 is moved across the field at a small distance from the ground during the harvesting operation, while it is raised for transport on a public road or on paths.

The harvested crop take-up arrangement 20 includes a conveyor arrangement 34 in the shape of a screw conveyor that conveys the crop taken up, in a manner known in itself, from the sides of the harvested crop take-up arrangement 20 to a discharge opening, not shown, located in the center. Located to receive the crop, when it passes to the rear through the discharge opening, are the supply rolls 30. A take-up device 36 is driven to rotate like the conveyor arrangement 34, and is arranged underneath and forward of the conveyor arrangement 34, and raises the crop from the ground with its conveying tines in order to transfer it to the conveyor arrangement 34. A hold-down 38 in the form of a sheet metal part is arranged above the take-up device 36. Alternatively, the hold-down 38 could be in the form of a roll or be provided with several bars. The axes of rotation of the conveyor arrangement 34 and of the take-up device 36 extend parallel to each other and to the ground and transverse to the direction of operation of the forage harvester 10.

Figure 2:
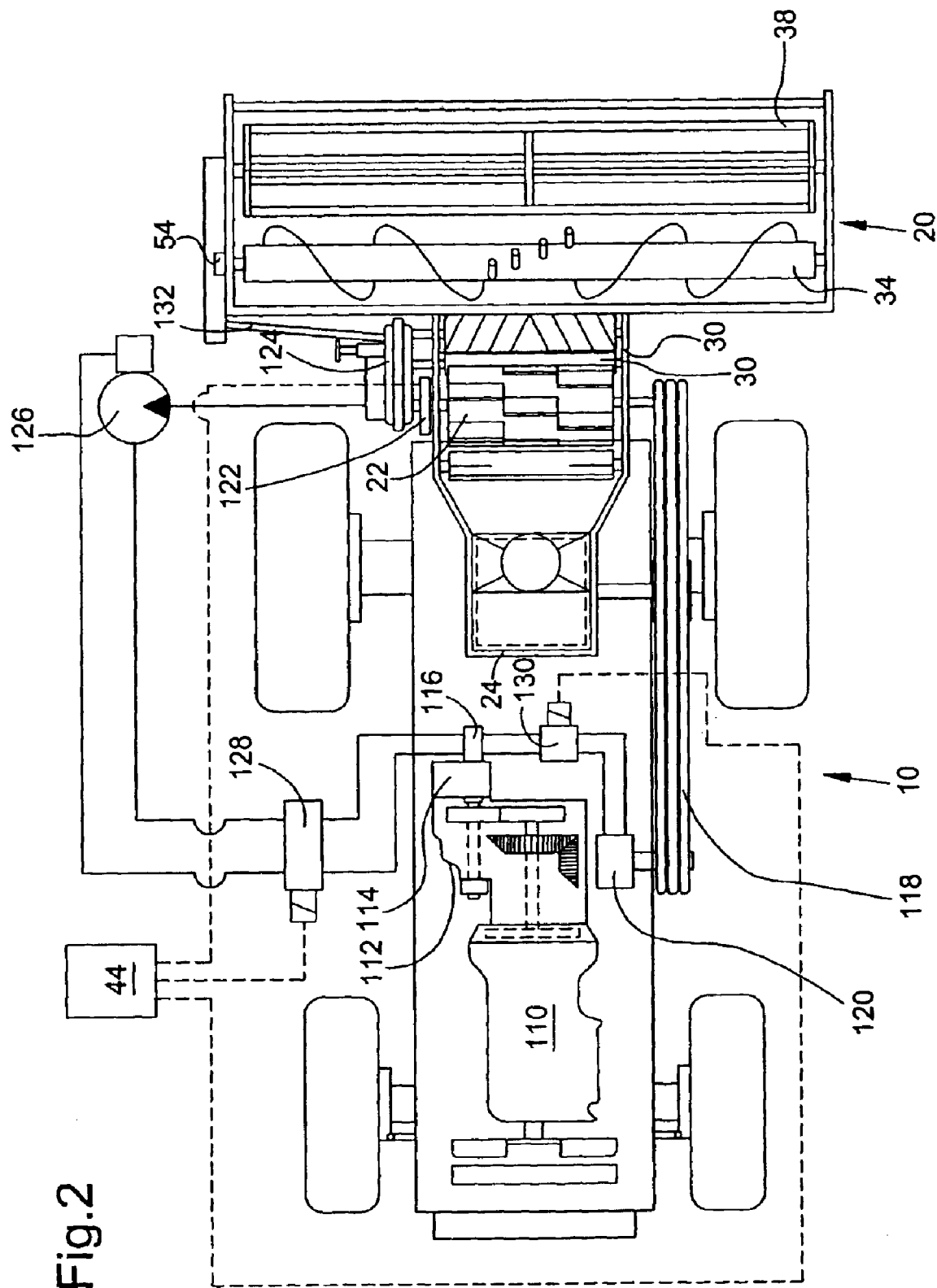
FIG. 2 is a schematic plan view of the drive elements of the harvesting machine.

Referring now also to FIG. 2, it can be seen that during the harvesting operation, the conveyor arrangement 34 and the take-up device 36 are driven mechanically by the internal combustion engine 110 of the forage harvester 10. The internal combustion engine 110 drives a hydrostatic pump 114 and an auxiliary hydraulic pump 116 over a bevel gearbox 112. The bevel gearbox 112 drives a drive belt 118 over a hydraulically actuated and electronically controlled main clutch 120. The belt drives the chopper drum 22 and the blower 24 of the forage harvester 10. Furthermore, the drive of the chopper drum 22 is connected over a usual electrically actuated clutch 122, with a length-of-cut gearbox 124 for the supply rolls 30, that drives the supply rolls 30. A reversible hydraulic motor 126 is coupled with the length-of-cut gearbox 124 in order to drive the supply rolls 30 during reverse operation. The reversible motor 126 is supplied with pressurized hydraulic fluid provided by the auxiliary pump 116 and is conducted to the reversible motor 126 over an electromagnetically actuated valve 128. An electromagnetically actuated valve 130 controls the fluid connection between the pump 116 and the main clutch 120. A control arrangement 44 controls the valves 128 and 130 as well as the clutch 122. It should be noted that the length-of-cut gearbox 124, in another embodiment, may be equipped with a planetary gearbox that makes possible a continuously variable adjustment of the length of cut by means of a hydraulic motor from the operator's cab 18. In this respect, reference is made to the disclosure of DE 198 12 500 A, which is incorporated into the present application by reference.

A removable articulated shaft 132 extends between the length-of-cut gearbox 124 and the rear side of the crop take-up arrangement 20. The conveyor arrangement 34 and the take-up device 36 are driven by means of the articulated shaft 132.

The relative position of the conveyor arrangement 34 to the take-up device 36 could be invariable, however as a rule, it is variable due to the support in bearings of the conveyor arrangement 34 on lever arms. The aforementioned lever arms on both sides are spring loaded in order to force the conveyor arrangement 34 against the crop. The position of the hold-down device 38 can be repositioned between the operating position, shown in FIG. 1 in solid lines, in which the hold-down device 38 interacts with the take-up device 36, and a non-operating position in which the hold-down device is shown in dashed lines indicated by number call-out 38'. For this purpose, a hydraulic cylinder 42 is used (which could also be replaced by an electric motor), that is arranged to rotate the hold-down device 38 about a horizontal axis 43 extending transverse to the direction of operation of the forage harvester 10. The non-operating position of the hold-down device 38 has been shown to be useful during reverse operation, in which the supply rolls 30, the conveyor arrangement 34, and the take-up device 36 (optionally also the chopper drum 22) are operated in a direction of rotation opposite to the normal harvesting operation, in order to be able to eject jammed material. The reverse operation is performed by the reversible hydraulic motor 126 at the length-of-cut gearbox 124. Even when a metal detector, not shown, arranged within one of the supply rolls 30, responds and turns off the drive of the supply rolls 30, a reverse operation is appropriate.

The control arrangement 44 is provided in order to be able to move the hold-down device 38 automatically between the operating position and the non-operating position and to activate the reverse operation. It is connected (preferably over a CAN bus) with one or more knock sensors 48 at the shear bar 46 and an electromagnetically controlled valve 50, which controls the load on the hydraulic cylinder 42. The knock sensor 48 is used to automatically reposition the spacing between the shear bar 46 and the chopper drum 22, since it detects the noises resulting from the impact of the knives of the chopper drum 22 on the shear bar 46. Furthermore, the control arrangement 44 is also connected over the CAN bus with the clutch 124, the valves 128 and 130 (see FIG. 2), a display arrangement 52 within the range of vision of the operator in the operator's cab 18, and a torque sensor 56 that is arranged to measure the torque of a supply roll 30.

An overload clutch 54, in the form of a cam-controlled clutch, is inserted into the driveline of the conveyor arrangement 34 between the conveyor arrangement 34 and the articulated shaft 132, that connects it with the length-of-cut gearbox 124, used for its mechanical drive at the side of the intake housing 32 of the forage harvester. An embodiment of the overload clutch is explained below on the basis of FIG. 4. The overload clutch 54 separates the driveline of the conveyor arrangement 34, when the torque transmitted by the overload clutch 54 exceeds an established limit value determined by the overload clutch 54. In such a case, that as a rule, is caused by a crop jam in the conveyor arrangement 34, that results in particular from an excessive amount of crop taken up, the overload clutch 54 generates mechanical vibrations in the form of a rattle. These vibrations are transmitted by the frame of the crop take-up arrangement 20 and the intake housing 32 to the knock sensor 48.

The control arrangement 44 is arranged to monitor the signals from the knock sensor 48 and from the torque sensor 56 during the harvesting operation. If the signal of the torque sensor 56 indicates that a threshold value has been crossed, which points to a crop jam at the supply rolls 30, the mechanical drive of the chopper drum 22, the supply rolls 30, the conveyor arrangement 34 and the take-up device 36 is turned off by means of the valve 130 and the main clutch 120. Concurrently, the hold-down 38 is raised by actuation of the valve 50 and, after the expiration of a pre-determined time interval, reverse operation is initiated, in that the clutch 122 is disengaged and the reverse motor 126 is activated over the valve 128. Furthermore, the operator is notified about the crop jam over the display arrangement 52.

Figure 3:
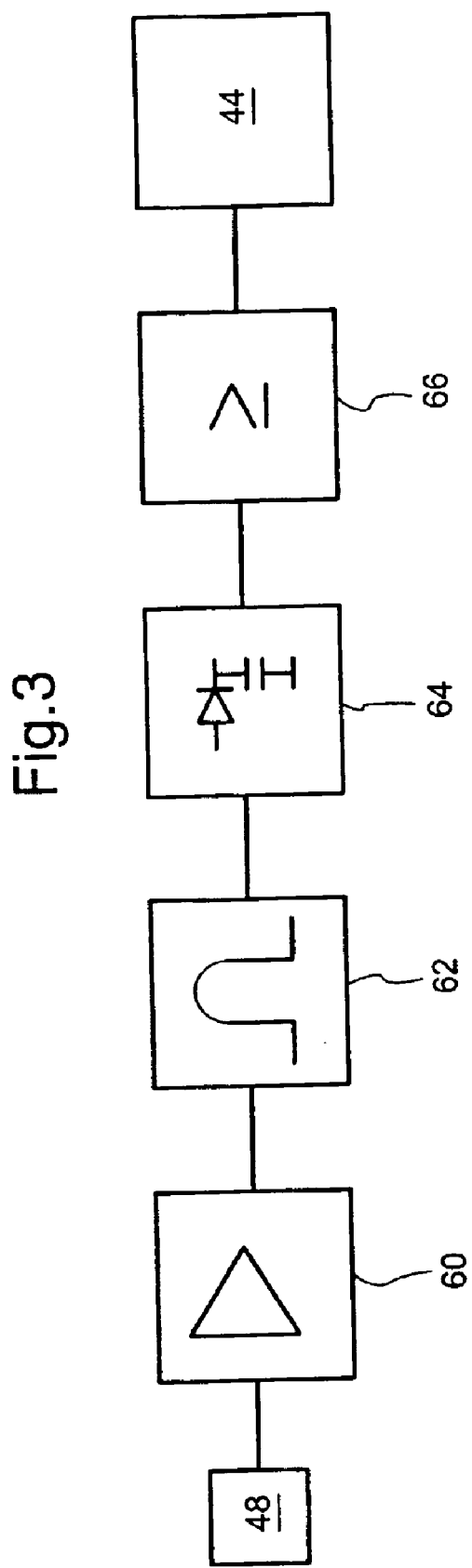
FIG. 3 shows an example of an analog signal processing circuit of the detection arrangement.

Analogously, the procedure is performed as soon as the knock sensor 48 receives signals generated by the overload clutch 54. For this purpose, an analog signal processing circuit is inserted between the knock sensor 48 and the digital control arrangement 44, as shown in FIG. 3. The signal processing circuit includes an amplifier 68, whose input is connected with the knock sensor 48. The amplified signal is conducted to a band pass filter 62 that only permits frequencies that are generated by the overload clutch 54 to pass to the knock sensor 48. The filtered signals are rectified in a rectifier 64 and are compared in a comparator 66 with a comparable value. When the signals from the knock sensor 48 exceed a threshold value from which the presence of a crop jam can be assumed, the comparator 66 transmits a corresponding signal to the control arrangement 44. It would also be possible to replace the analog signal processing circuit shown in FIG. 4 with a digital signal processor that can be realized as a process running in the control arrangement 44 or by an external circuit to which a digitized signal of the knock sensor 48 is conducted. The digital signal processor could perform the operation of the analog signal processing circuit shown in FIG. 3 in order to analyze the signal spectrum made available by the knock sensor 48 for frequencies that are characteristic of a disengaged overload clutch 54.

If the output signal of the signal processor points to the fact that the torque of the overload clutch 54 has exceeded the threshold or limit value, the normal drive of the chopper drum 22, the supply rolls 30, the conveyor arrangement 34, and the take-up device 36 is turned off. As is the case when a crop jam of the supply rolls 30 has occurred, the hold-down 38 is raised, the operator is informed over the display device 52, and the reverse operation is initiated. In the case of a response from the metal detector, the control arrangement 44 also proceeds in a corresponding manner, that is, it turns off the aforementioned elements, raises the hold-down device, and after a time delay, begins the reverse operation. The result is that the raising of the hold-down device 38 occurs before the point in time that the reverse operation begins. If these events occur simultaneously, a jam could possibly occur during the reverse operation. The operator can initiate the normal harvesting operation manually after the crop jam has been removed. After a certain reverse operating time interval, the normal harvesting operation can also be resumed automatically by the control arrangement 44. It should be noted that the signal of the knock sensor 48 can also be used for the detection of the presence of a crop flow as it is disclosed in DE 102 11 800, whose contents is incorporated into the present application by reference.

Figure 4:
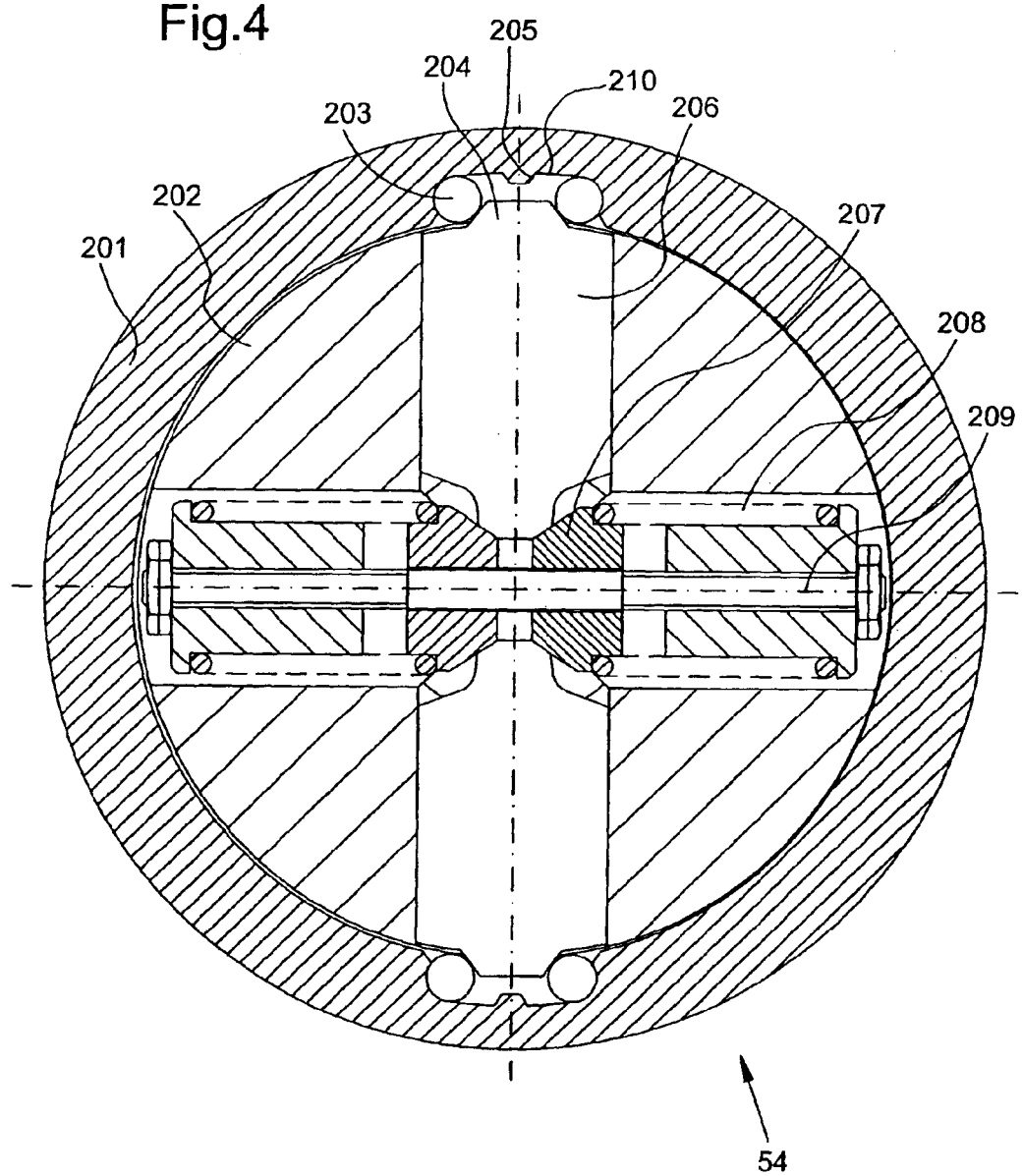
FIG. 4 is a section taken through an overload clutch.

FIG. 4 shows a section through an appropriate overload clutch 54 in its torque transmission position. After the occurrence of an overload, the overload clutch 54 rotates at a reduced ratchet torque. The overload clutch 54, shown in FIG. 4, consists generally of a clutch sleeve 201, in which a clutch hub 202 is retained. Driver bodies 206 are guided, free to move radially, in the clutch hub 202 and retained radially outward by support cams 207 loaded in the inward direction by springs 208. The forces of the springs 208 are supported at the radially outer side on end stops of a common pin 209, with the result that the spring forces are completely balanced at all times. Recesses 210 are provided uniformly distributed around the circumference in the clutch sleeve 201, in each of which two rolling bodies 203 are retained. The recesses 210 are provided with centrally arranged cams 205 that are used as stops for the rolling bodies 203 after the occurrence of an overload, in which the rolling bodies 203 are carried along by the head parts 204 of the driver bodies 206. The effective length of the recesses 210 in the circumferential direction is reduced by the sliding of one of the rolling bodies 203 up to the cam 205 so that the clutch runs with a reduced ratchet torque. By reducing the rotational speed, a condition can be attained in which the head parts 204 of the driver bodies 206 are in a position to return the rolling bodies 203 that were shifted out of their end positions into their torque transmission position, and thereby to enable the head parts 204 to re-occupy the torque transmission position between two rolling bodies 203. When the predetermined torque is exceeded, the driver bodies 106 that knock against the rolling bodies 203 generate rattling vibrations that are taken up by the knock sensor 48 and are detected by the control arrangement 44.

Having described the preferred embodiment, it will become apparent that various modifications can be made without departing from the scope of the invention as defined in the accompanying claims.

What is claimed is:

1. In a harvesting machine having a crop conveying element for delivering crop to further crop processing components of the harvesting machine, a power source, a driveline coupled between said power source and said crop conveying element and containing an overload clutch, a crop jam detection arrangement for the detection of a crop jam in the harvesting machine, comprising: said overload clutch including torque transfer elements which generate acoustic and/or mechanical vibrations when said clutch experiences a torque in excess of a pre-determined limit value; a sensor located on said machine for sensing said vibrations and generating an input signal representative of said vibrations; and a control arrangement coupled to said sensor for receiving said input signal and operable for processing said input signal and for sending a control signal when said input signal rises above a threshold representative of a crop jam condition.

2. The harvesting machine, as defined in claim 1, wherein said sensor is a knock sensor.

3. The harvesting machine, as defined in claim 2, wherein said harvesting machine is a forage harvester and includes a shear bar and a cutter knife drum rotating so as to cooperate with said shear bar to cut crop, delivered across the shear bar, into small pieces; and said knock sensor being mounted adjacent said shear bar and operable for sensing engagement between knives carried by said cutter knife drum and said shear bar.

4. The harvesting machine, as defined in claim 1, wherein said harvesting machine is a forage harvester; said forage harvester including a crop take-up arrangement mounted to a forward end of said forage harvester; said crop conveying element being a component of said crop take-up arrangement; said driveline and overload clutch being located on said take-up arrangement; and said sensor being located on said forage harvester in a location remote from said crop conveyor.

5. The harvesting machine, as defined in claim 1, wherein said overload clutch is a cam-controlled clutch.

* * * * *